3,390,978
METHOD OF INHIBITING PLANT GROWTH
John K. Leasure, Carbondale, Ill., and Dorsey R. Mussell, Clare, Mich., assignors to The Dow Chemical Company, Midland, Mich., a corporation of Delaware
No Drawing. Filed May 11, 1966, Ser. No. 549,142
2 Claims. (Cl. 71—85)

ABSTRACT OF THE DISCLOSURE

Contact a plant part with a compound

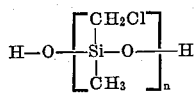

where $n$ is from 2 to a large number.

DESCRIPTION OF THE INVENTION

This invention is concerned with the modification of the growth characteristics of plants and is particularly directed to compositions and methods for the suppression and control of the growth of germinant seeds, emerging seedlings and established plants of many undesirable weed species.

According to the present invention, it has been discovered that the growth characteristics of many plants may be modified or altered by contacting plants or plant parts with a growth-altering amount of a silane compound of the formula:

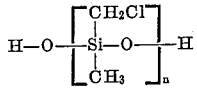

wherein $n$ is an integer from 2 to a large number. Thus the active compounds of this invention are regarded as polymers of chloromethyl methylsilane diols, or in an alternate name, as polymeric chloromethyl methylsiloxanes. The dimer is active. The resinous high polymer is also active.

More particularly, it has been discovered that the growth of germinant seeds, can be suppressed and inhibited by exposing the seeds or to the action of a growth-altering or growth-inhibiting amount of the said polymer.

The polymer compounds vary to some extent in physical form with degree of polymerization. They are somewhat soluble in many organic solvents and of very little solubility in water. They are particularly adapted to be employed as active constituents in compositions for the alteration of the growth or the killing of plants.

The exposure of a viable form of plant, or of plants and plant parts, to the action of the silane polymer gives rise to varying responses depending upon the nature of the plant or plant part, the stage of growth or maturity of the plant, the polymer compound employed and the dosage at which the exposure is carried out. When large dosages are dispersed in growth media, a persistent inhibition of the growth of the seeds, emerging seedlings and established plants of many plant species is obtained. The weathering action of the sun, rain and possibly the decomposition of the polymer compound by the action of bacteria, eventually reduces its concentration in growth medium.

The exposure of the plant part to the action of a growth-altering amount of the polymer is essential for the practice of the present invention. The exact dosage to be employed to obtain such exposure is dependent upon such factors as soil type, depth to which the compound is distributed in the soil, and amount of rainfall, as well as upon the plant species to be controlled and the stage of growth thereof. In non-selective herbicide applications, good results are obtained when germinant seeds or established plants are exposed to dosages of from 50 to 250 pounds or more of the polymer compound per acre. In soil, good results are obtained when the compound is distributed therein in amounts of from 1 to 250 parts or more by weight per million parts by weight of soil.

The method of the present invention may be carried out by applying to the above-ground portion of plants, or by applying to the growth media, the unmodified silane compounds. However, the present method also embraces the employment of a liquid or dust composition containing said compounds. In such usage, the compounds may be modified with one or more of a plurality of additaments or herbicide adjuvants such as water, petroleum distillates, or other organic solvent carriers, surface active dispersing agents and finely divided inert solids. Such augmented compositions are adapted to be distributed in or on the soil or on the above-ground portion of the plants, or employed as concentrates and subsequently diluted with additional inert carrier to produce the ultimate treating compositions.

The exact concentration of silane polymer compound to be employed in compositions for the treatment of growth media and plants is not critical and may vary considerably provided the required dosage of active agent is supplied in the growth media or upon the above-ground surfaces of plants. The concentration of toxicant in liquid compositions employed to supply the desired dosage generally is from about 0.1 to 50 percent by weight, although concentrations of 0.001 percent by weight may be employed in irrigation treatments of soil. In dusts, the concentration of toxicant may be from 0.5 to 50 percent by weight, although concentrations as low as 0.1 percent are sometimes employed. In compositions to be employed as concentrates, the toxicant can be present in a concentration of from about 1 to 98 percent by weight.

The quantity of treating composition to be applied may vary considerably provided the required dosage of active ingredient is applied in sufficient of the finished composition adequately to cover the vegetation to be treated or to facilitate the penetration and distribution of the active ingredient in growth media. The required amount of active ingredient in the soil conveniently may be supplied, per acre treated, in from 40 to 27,000 gallons or more of the aqueous carrier, in 0.5 to 500 gallons of organic solvent or in from 50 to 2,000 pounds of inert solid carrier. In the treatment of seedling weeds, good coverage is obtained when using from 10 to 100 gallons or more of finished spray composition per acre. Where well developed vegetation with full foliage is concerned, it is frequently desirable to employ up to 250 gallons or more of the finished spray composition per acre to assure good coverage of the above-ground portion of the vegetation. In the application of dusts to plant foliage, good results are obtained with from 50 to 2,000 pounds of finished dust composition per acre, the only requirements being that the required toxicant dosage be supplied in a herbicidal amount.

Liquid compositions containing the desired amount of the silane polymer compound may be prepared by dissolving the toxicant in an organic liquid such as acetone, xylene or pertoleum distillate or by dispersing the toxicant in water with or without the aid of a surface active dispersing agent such as an ionic or non-ionic emulsifying agent. The aqueous compositions may contain one or more water-immiscible solvents for the silane compound. In such compositions, the carrier comprises an equeous emulsion, that is, a mixture of water-immiscible solvent, emulsifying agent and water. The choice of dispersing and emulsifying agent and the amount thereof employed is dictated by the nature of the composition and by the ability of the agent to facilitate the dispersion of the compound in the carrier to produce the desired composition. Dispersing and emulsifying agents which may be employed in the compositions include the condensation products of alkylene oxides with phenols and organic acids, alkyl aryl sulfonates, polyoxyethylene derivatives of sorbitan esters, complex ether alcohols, mahogany soaps and the like. The surface active dispersing agents are generally employed in concentrate compositions in the amount of from 0.1 to 20 percent by weight of the combined weight of the silane compound and the surface active agent.

In the preparation of dust compositions, the silane compound is dispersed in and on a finely divided inert solid such as talc, chalk, gypsum and the like. In preparing such compositions the carrier can be mechanically ground with the compound or wet with a volatile solvent solution thereof.

Similarly, dust compositions containing the compound may be prepared with various of the solid surface active dispersing agents such as fuller's earth, bentonite, attapulgite and other clays. Depending upon the proportions of ingredients, these dust compositions may be employed as concentrates and subsequently diluted with additional solid surface active dispersing agent or with talc, chalk, gypsum and the like to obtain the desired amount of active ingredient in a composition adapted to be employed for the control of the growth of vegetation. Also, such concentrate dust compositions may be dispersed in water with or without the aid of a dispersing agent to form spray mixtures.

When operating in accordance with the present invention, a growth-inhibiting amount of the compound or a composition containing the compound is dispersed in any convenient fashion in soil or other growth medium, i.e., by simple mixing with the growth medium, by applying to the surface of soil and thereafter dragging or disking into the soil to the desired depth, or by employing a liquid carrier to accomplish the peneration and impregnation. The application of the spray and dust compositions to the surface of soil or to the above-ground surfaces of plants may be carried out by conventional methods, for example, with power dusters, boom or hand sprayers and spray dusters.

In a further method, the distribution in soil may be accomplished by introducing the toxicant in the water employed to irrigate the soil. In such procedure, the amount of water and the ratio of toxicant to water can be varied in accordance with the porosity and water-holding capacity of the soil in order to obtain the desired depth of distribution of the toxicant.

The following examples illustrate the present invention but are not to be construed as limiting.

Example 1

Four parts by weight of a resinous high-polymeric chloromethyl methylsiloxane, 0.08 part by weight of sorbitant trioleate (Span 85) and 0.02 part of a sorbitan monolaurate polyoxyethylene derivative (Tween 80) are dispersed in 40 milliliters of acetone to produce a concentrate composition in the form of a water-dispersible liquid containing the siloxane polymer as the active agent. A portion of this concentrate composition is dispersed in water to produce an aqueous spray composition containing 10,000 parts by weight of the siloxane compound per million parts by weight of ultimate mixture. This composition is applied to soil heavily planted with seed af Japanese millet and radish, at the rate of 100 pounds of said polymer per acre. The treatments are carried out with conventional spraying equipment. The soil plots are thereafter exposed to good growing conditions. After about two weeks the plots are examined to ascertain what control of the growth of the plants had been obtained. No live plants or viable seed are found. In contrast, check plots similarly treated but without toxicant show excellent, normal growth.

Example 2

Four parts by weight of the polymer employed in Example 1, 0.08 part of sorbitan trioleate (Span 85) and 0.02 part of a sorbitan monolaurate polyoxyethylene derivative (Tween 80) were dispersed in 40 milliliters of acetone to produce a concentrate composition in the form of a water-dispersible liquid. A portion of this concentrate composition was dispersed in water to produce an aqueous spray composition containing 0.172 pound of the silane polymer compound per 100 gallons of ultimate mixture. This aqueous composition was employed for the treatment of soil and observations made of the control of the growth of seeds and emerging seedlings of various plants. In the determinations, the compositions were employed to treat seed beds which had been prepared and seeded with selected plant species. In the treating operations, the compositions were applied as a soil drench to supply a uniform dosage of about 50 pounds of the siloxane compound per acre. This dosage corresponds to a concentration of about 50 parts of the silane compound per million parts by weight of soil. Other areas similarly seeded with the plant species were left untreated to serve as checks.

After about 4 weeks, the areas were examined to ascertain what control of the growth of seeds and emerging seedlings had been obtained.

Japanese millet and radish, representing the Gramineae and Cruciferae, respectively, were severly stunted and injured. Outright kill was rated at 40 percent.

The polymer employed in accordance with the present teaching, is prepared by known methods. As one method, reference is made to U.S. Patent 2,521,674.

What is claimed is:

1. A method which comprises contacting a living plant part with a growth inhibiting amount of a polymer of the formula:

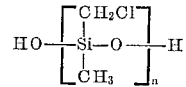

wherein $n$ is an interger greater than 1.

2. Method of claim 1 wherein the silane compound is a resinous high polymer.

References Cited

UNITED STATES PATENTS 2,923,095 2/1960 Magimel-Pelonnier et al. 47—58
3,183,076 5/1965 Leasure et al. _____ 71—2.5

JAMES O. THOMAS, Jr., *Primary Examiner.*